United States Patent
Garcia Crespo et al.

(10) Patent No.: US 12,225,426 B2
(45) Date of Patent: Feb. 11, 2025

(54) SYSTEMS AND METHODS FOR DETERMINING A SOURCE OF INTERFERENCE BASED ON CURRENT MEASUREMENTS OF A MEASUREMENT DEVICE

(71) Applicant: Verizon Patent and Licensing Inc., Basking Ridge, NJ (US)

(72) Inventors: Hector A. Garcia Crespo, North Richland Hills, TX (US); Brian A. Ward, Fort Worth, TX (US); Timothy E. Coyle, Chicopee, MA (US); Matthew Kapala, North Billerica, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 415 days.

(21) Appl. No.: 17/810,733

(22) Filed: Jul. 5, 2022

(65) Prior Publication Data
US 2024/0015469 A1    Jan. 11, 2024

(51) Int. Cl.
*H04W 4/021* (2018.01)
*H04B 17/345* (2015.01)
(Continued)

(52) U.S. Cl.
CPC .......... *H04W 4/021* (2013.01); *H04B 17/345* (2015.01); *H04B 17/3913* (2015.01); *H04W 4/029* (2018.02); *H04W 64/00* (2013.01)

(58) Field of Classification Search
CPC ..... H04W 4/021; H04W 4/029; H04W 64/00; H04B 17/345
See application file for complete search history.

(56) References Cited

U.S. PATENT DOCUMENTS 9,351,299 B2 *  5/2016  Kazmi ................. H04W 16/14
10,187,098 B1   1/2019  Tsui et al.
(Continued)

FOREIGN PATENT DOCUMENTS

WO    2017072552 A1    5/2017
WO    2019203704 A1    10/2019

OTHER PUBLICATIONS

Co-pending U.S. Appl. No. 16/896,323, entitled "Systems and Methods for Identifying a Source of Radio Frequency Interference in a Wireless Network," by Ricardo Francisco Borges et al., filed on Jun. 9, 2020, 41 pages.
(Continued)

*Primary Examiner* — Hai V Nguyen

(57) ABSTRACT

A device may determine that a first geographical area satisfies an area threshold. The first geographical area includes an estimated location of a source of interference associated with base stations. A first plurality of vertices, of the first geographical area, are based on locations of the base stations. The device may determine a second plurality of vertices. The second plurality of vertices are closer to the estimated location than the first plurality of vertices. The device may provide information regarding the second plurality of vertices and may obtain magnitude information indicating magnitudes of the interference measured at the second plurality of vertices. The device may determine a third plurality of vertices based on the magnitude information. The device may provide information regarding a second geographical area, formed by the third plurality of vertices, to cause a search of the second geographical area to identify the source of the interference.

20 Claims, 12 Drawing Sheets

(51) Int. Cl.
*H04B 17/391* (2015.01)
*H04W 4/029* (2018.01)
*H04W 64/00* (2009.01)

(56) References Cited

U.S. PATENT DOCUMENTS

| | | | | |
|---|---|---|---|---|
| 10,516,999 | B1* | 12/2019 | Desai | H04W 16/28 |
| 10,945,171 | B2* | 3/2021 | Kalathil | H04W 64/006 |
| 11,075,740 | B2* | 7/2021 | Karabinis | H04W 4/44 |
| 11,100,796 | B2* | 8/2021 | Karabinis | H04L 67/52 |
| 11,283,529 | B2* | 3/2022 | De Rosa | H04W 4/44 |
| 11,558,132 | B2* | 1/2023 | Borges | H04B 17/27 |
| 11,635,482 | B2* | 4/2023 | Garcia Crespo | G01S 5/0215 370/252 |
| 11,777,623 | B2* | 10/2023 | Borges | H04B 17/3912 370/252 |
| 11,968,000 | B2* | 4/2024 | Balachandran | H04B 17/336 |
| 11,988,762 | B2* | 5/2024 | Crespo | H04B 17/336 |
| 2009/0043504 | A1* | 2/2009 | Bandyopadhyay | G01S 19/49 701/469 |
| 2012/0190380 | A1* | 7/2012 | Dupray | G01S 5/0278 455/456.1 |
| 2013/0288692 | A1* | 10/2013 | Dupray | H04W 64/00 455/450 |
| 2014/0378067 | A1 | 12/2014 | Au | |
| 2015/0011233 | A1* | 1/2015 | Kazmi | H04W 72/044 455/454 |
| 2015/0312837 | A1* | 10/2015 | Baldwin | H04W 4/027 370/252 |
| 2015/0350940 | A1 | 12/2015 | Wilson et al. | |
| 2017/0276830 | A1* | 9/2017 | Jang | G01B 11/26 |
| 2017/0325221 | A1* | 11/2017 | Jalali | H04W 72/0446 |
| 2018/0013594 | A1* | 1/2018 | Mukkavilli | H04L 5/14 |
| 2018/0323815 | A1 | 11/2018 | Beadles et al. | |
| 2019/0052294 | A1 | 2/2019 | Abdelmonem | |
| 2019/0280763 | A1* | 9/2019 | Smyth | H04B 7/18513 |
| 2019/0364492 | A1* | 11/2019 | Azizi | H04W 52/0261 |
| 2020/0007825 | A1* | 1/2020 | Jeong | H04N 23/695 |
| 2020/0074857 | A1* | 3/2020 | Karabinis | H04L 67/12 |
| 2020/0127901 | A1 | 4/2020 | Hariharan et al. | |
| 2020/0244430 | A1* | 7/2020 | Karabinis | H04L 5/04 |
| 2020/0266903 | A1* | 8/2020 | De Rosa | H04B 7/18506 |
| 2020/0364187 | A1* | 11/2020 | Tran | G06N 3/02 |
| 2021/0127284 | A1 | 4/2021 | Abdelmonem et al. | |
| 2021/0314130 | A1* | 10/2021 | Karabinis | H04L 5/04 |
| 2021/0318139 | A1* | 10/2021 | Loch | G01S 19/21 |
| 2021/0344432 | A1* | 11/2021 | Balachandran | H04B 17/336 |
| 2022/0166525 | A1* | 5/2022 | De Rosa | H04B 15/00 |
| 2022/0264312 | A1* | 8/2022 | Furuichi | H04B 7/0617 |
| 2022/0386311 | A1* | 12/2022 | Furuichi | H04W 16/14 |
| 2023/0121760 | A1* | 4/2023 | Bennington | G01S 19/28 342/357.45 |
| 2023/0209370 | A1* | 6/2023 | Pateromichelakis | G06N 20/00 370/328 |
| 2023/0262611 | A1* | 8/2023 | Kuriki | H04W 52/243 455/522 |
| 2023/0341502 | A1* | 10/2023 | Wigren | G01S 5/017 |
| 2024/0073854 | A1* | 2/2024 | Rao | G01S 5/0036 |
| 2024/0223292 | A1* | 7/2024 | Balachandran | H04B 17/336 |

OTHER PUBLICATIONS

Co-pending U.S. Appl. No. 17/200,125, entitled "Systems and Methods for Detecting a Most Impacted Base Station Sector By an External Interference Source," by Ricardo Francisco Borges et al., filed on Mar. 12, 2021, 50 pages.

\* cited by examiner

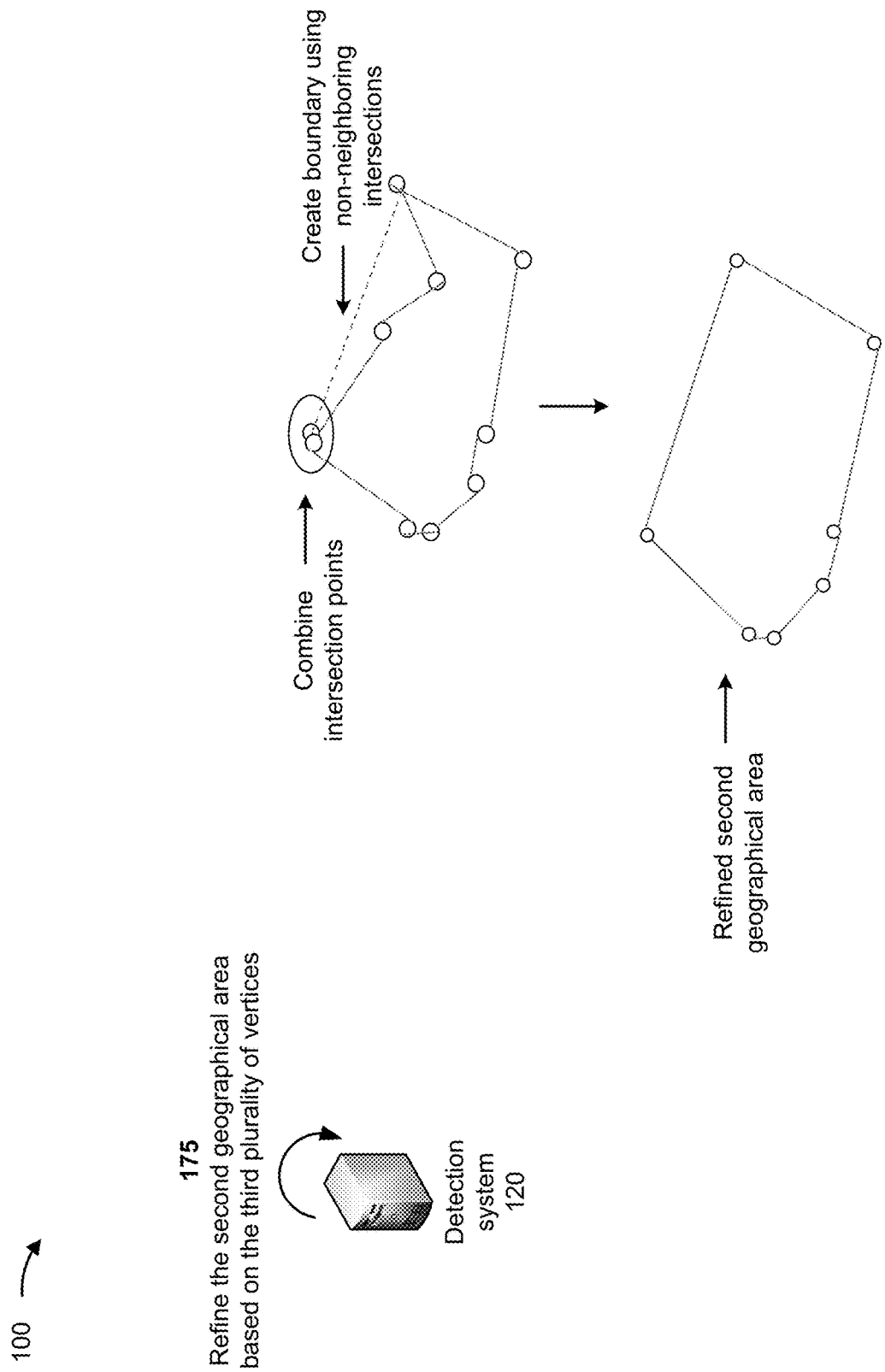

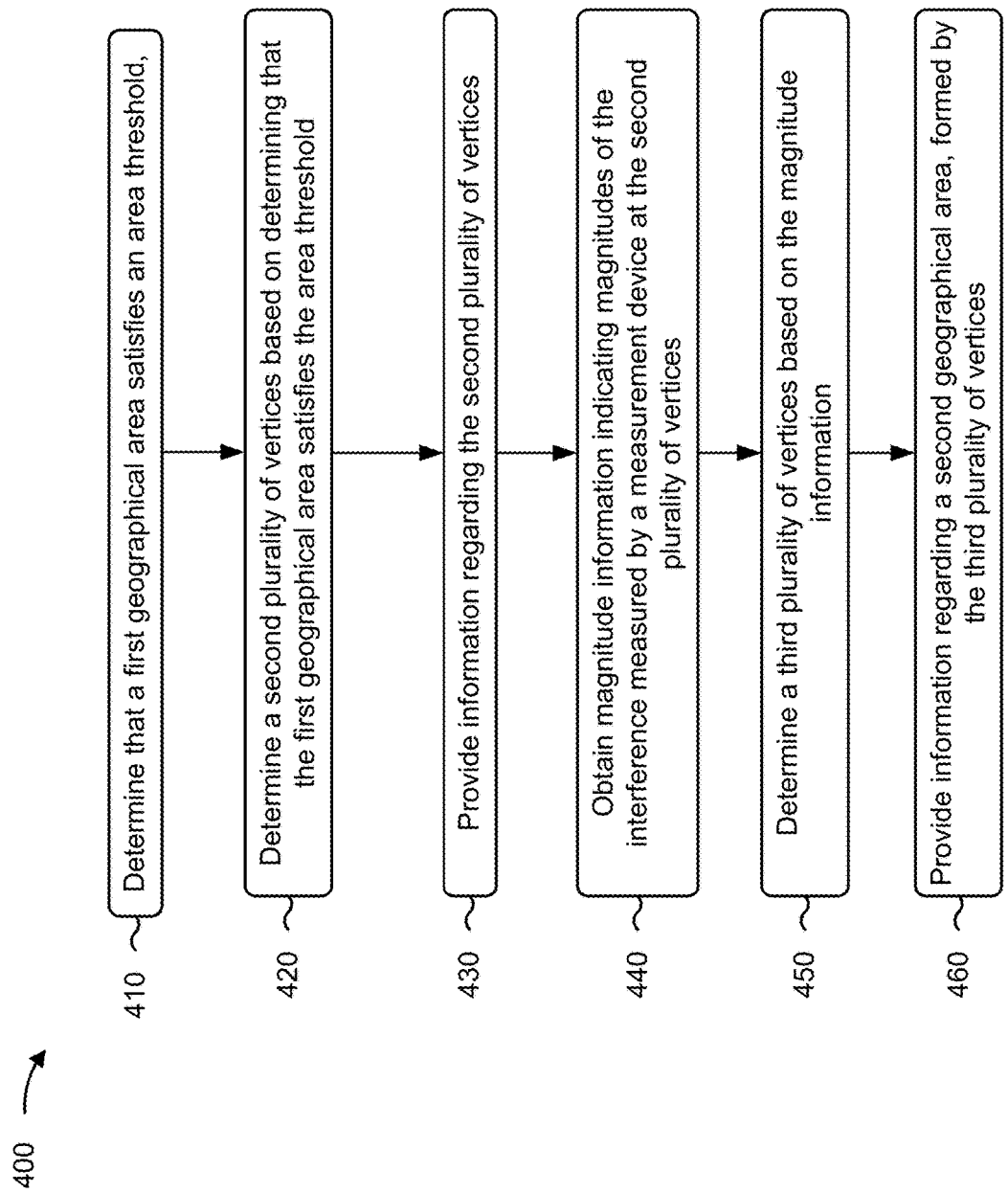

SYSTEMS AND METHODS FOR DETERMINING A SOURCE OF INTERFERENCE BASED ON CURRENT MEASUREMENTS OF A MEASUREMENT DEVICE

BACKGROUND

A base station sends and receives wireless radio transmissions to and from an end user mobile device (e.g., a user equipment or UE), and controls low-level operation of UEs connected to the base station via a radio access network (RAN). In some situations, the base station may experience interference. The interference may negatively affect the wireless radio transmissions to and from the UEs.

BRIEF DESCRIPTION OF THE DRAWINGS

FIGS. 1A-1I are diagrams of an example associated with determining a source of interference based on current measurements of interference.

FIG. 4 is a flowchart of an example process relating to determining a source of interference based on current measurements of interference.

DETAILED DESCRIPTION OF PREFERRED EMBODIMENTS

Figure 1A:
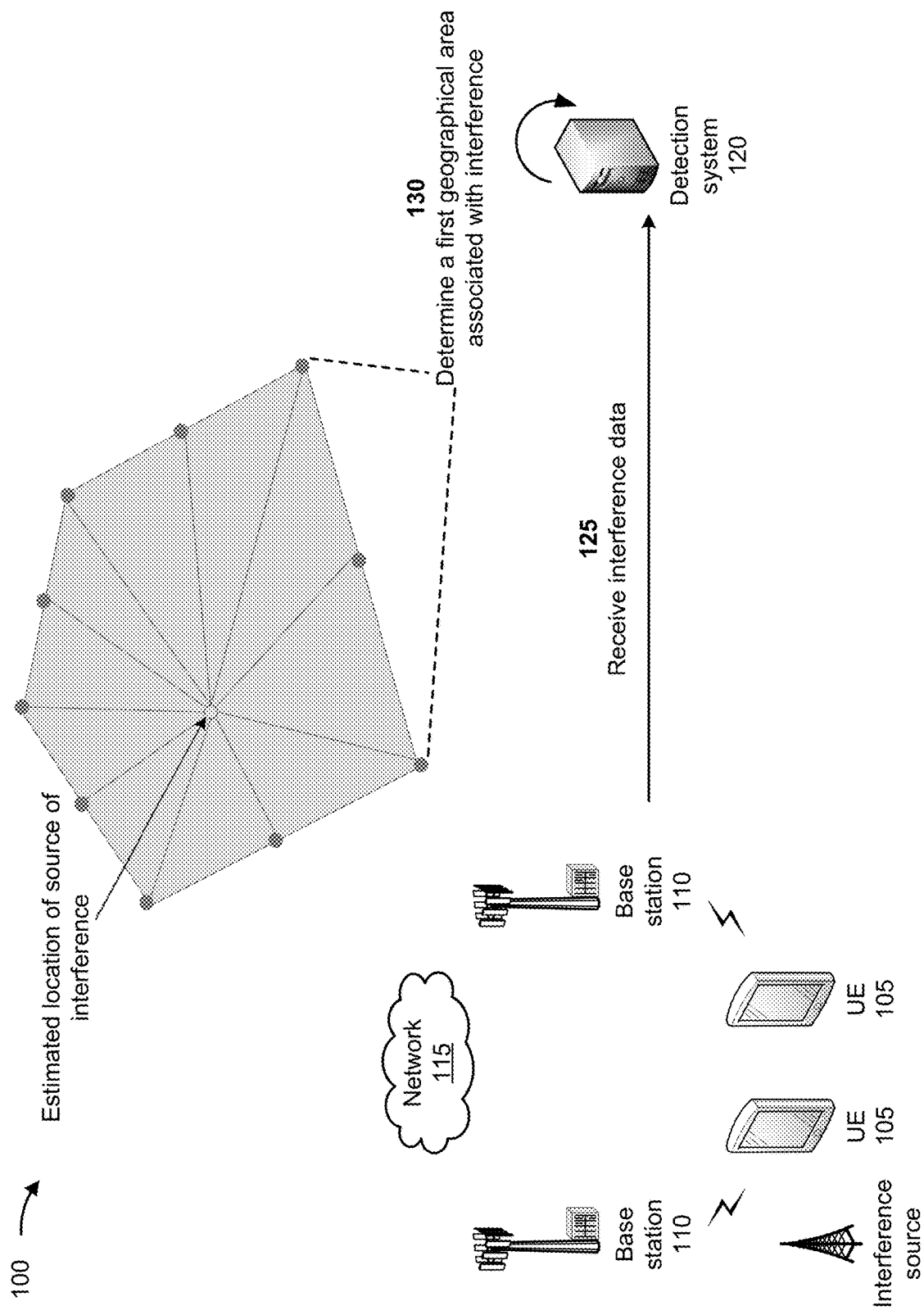

The following detailed description of example implementations refers to the accompanying drawings. The same reference numbers in different drawings may identify the same or similar elements.

Radio frequency (RF) interference of a base station may be caused by an electronic device (e.g., a source of interference) that radiates RF signals in the same frequency RF channels of the base station, without utilizing the RF signals to establish communication with the base station. Thus, the RF signals create noise and interfere with operation of the base station. In such situations, an entity associated with the base station must quickly determine a location of the source of interference so that the source of interference may be disabled, and that performance degradation of the base station may be avoided.

Current techniques for locating the source of interference include the time-consuming process of field engineers driving around a geographical area and attempting to locate the source of interference with RF signal sensors. The geographical area may be determined based on data regarding the interference. In some instances, the data may not be up-to-date. For example, the data may be multiple days old. Additionally, or alternatively, the geographical area, identified by the data, may be a large area. Accordingly, the field engineers may move around a large geographical area to search for the source of the interference based on data that is not up-to-date.

Additionally, the data may cause the field engineers to move around the large geographical area in an inefficient manner. For example, the data may cause the field engineers to move from a first location of the large geographical area to a second location that is far distant from the first location. Thus, current techniques for locating the source of interference consume energy resources, computing resources (e.g., processing resources, memory resources, and/or communication resources, among other examples), and/or networking resources, among other examples of resources associated with searching large geographical areas to locate the source of interference.

Some implementations described herein are directed to reducing a geographical area associated with an interference to improve a manner in which a search is performed to identify a source of the interference. For example, a detection system may receive interference data indicating interference associated with multiple base stations. The detection system may determine that a geographical area, determined based on the interference data, satisfies an area threshold (e.g., determine that the geographical area is large). Vertices of the geographical area may be based on locations of the base stations and the associated interference data observed.

Based on determining that the geographical area satisfies the area threshold, the detection system may determine different vertices that are closer to an estimated location of the source of the interference. As an example, the different vertices may be determined based on the base stations and the estimated location.

The detection system may cause measurements of magnitudes of the interference at locations associated with the different vertices. As an example, the detection system may provide instructions to a vehicle with a spectrum analyzer to cause the vehicle to navigate to the locations associated with the different vertices to determine the magnitudes of the interference at the locations. In some examples, the instructions may identify an order for navigating to locations associated with the different vertices. The vehicle may include an unmanned aerial vehicle (e.g., a drone). Alternatively, the vehicle may include an autonomous vehicle.

For example, based on the magnitudes of the interference, the detection system may determine, for each vertex of the different vertices, a radius that is an estimated distance from a location associated with the vertex to the estimated location. The detection system may determine new vertices based on the radiuses. The detection system may determine a new geographical area based on the new vertices.

The detection system may provide, to the vehicle, information regarding the new geographical area to cause the vehicle to search the new geographical area to determine the source of the interference. Alternatively, the information regarding the new geographical area may be provided to a user device of a field engineer.

In some examples, the detection system may identify points of interest in the new geographical area, determine interference scores for the points of interest, and provide information regarding the points of interest and the interference scores to the vehicle. The information regarding the points of interest and the interference scores may enable the vehicle to efficiently search the new geographical area for the source of the interference. Alternatively, the information regarding the points of interest may be provided to the user device of the field engineer.

Accordingly, implementations described herein may preserve energy resources, computing resources (e.g., processing resources, memory resources, and/or communication resources, among other examples), and/or networking resources, among other examples of resources that would have otherwise been consumed by searching large geographical areas to locate the source of interference.

FIGS. 1A-1I are diagrams of an example 100 associated with determining a source of interference based on current measurements of interference. As shown in FIGS. 1A-1I, example 100 includes user equipment (UEs) 105 associated with base stations 110, a network 115, and a detection system 120. Each of UEs 105 may include a wireless communication device, a mobile phone, a laptop computer, a tablet computer, and/or a desktop computer, among other examples Each base station 110 may include an eNodeB (eNB), a gNodeB (gNB), among other examples of base stations that provides cellular communications. Network 115 may include a RAN associated with a long-term evolution (LTE) or fourth generation (4G) network, a new radio (NR) or fifth generation (5G) network, and/or the like. Detection system 120 may include one or more devices that are configured to determine geographical areas for performing a search to identify a source of an interference.

As shown in FIG. 1A, and by reference number 125, detection system 120 may receive interference data. For example, detection system 120 may receive the interference data from multiple base stations 110 associated with network 115. Additionally, or alternatively, detection system 120 may receive the interference data from one or more other devices associated with network 115. A base station 110, of the one or more base stations 110 associated with the network 115, may be associated with multiple sectors corresponding to respective antennas of base station 110 facing in respective directions. Each sector may have one or more carriers (e.g., RF channels) for wireless communication with the UEs 105. In this regard, the interference data may include information identifying interference associated with one or more of the sectors.

Additionally, or alternatively, the interference data may include geographical data indicating locations of base stations 110 (e.g., latitude and longitude coordinates), information identifying logical configurations of base stations 110, information identifying physical configurations of base stations 110, and/or data indicating interference associated with a UE 105 (e.g., data indicating a signal-to-noise ratio associated with the UE 105), cell relation with handover attempts data, among other examples.

As shown in FIG. 1A, and by reference number 130, detection system 120 may determine a first geographical area associated with the interference. For example, detection system 120 may determine the first geographical area based on the interference data. The first geographical area may be an area to be searched to identify the source of the interference.

In some situations, detection system 120 may determine a first plurality of vertices of the first geographical area based on locations of base stations 110. Detection system 120 may determine boundaries of the first geographical area based on the first plurality of vertices. Detection system 120 may determine an estimated location of the source of the interference based on the interference data. As an example, detection system 120 may perform a computation (e.g., a triangulation) using the interference data to determine the estimated location of the source of the interference. The estimated location may correspond to a best guess location of the source of the interference. When determining the first geographical area, detection system 120 may determine an area that includes the estimated location.

Figure 1B:
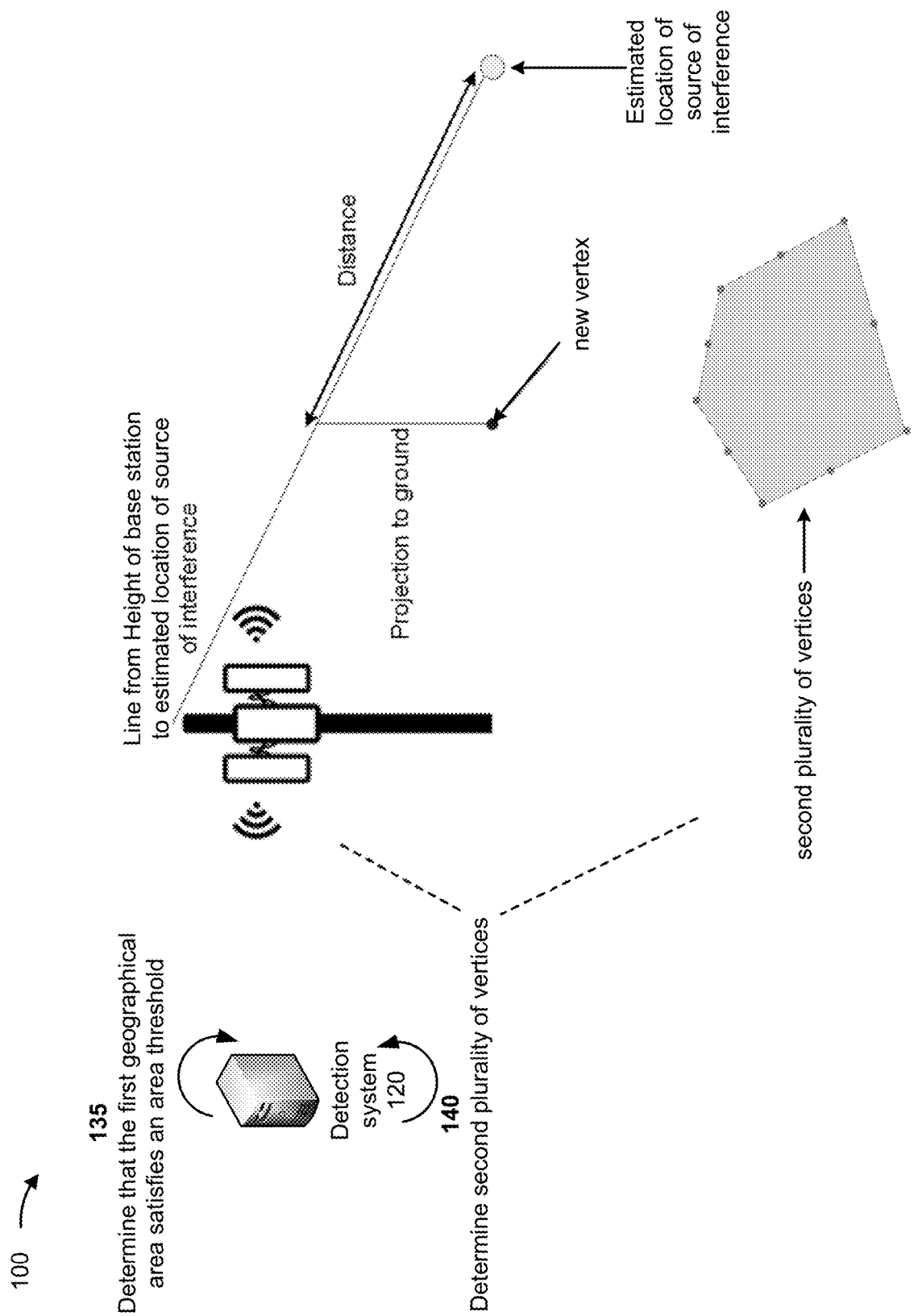

As shown in FIG. 1B, and by reference number 135, detection system 120 may determine that the first geographical area satisfies an area threshold. For example, detection system 120 may determine that the first geographical area satisfies the area threshold based on dimensions of the first geographical area. For example, detection system 120 may determine that a width of the first geographical area satisfies a width threshold, that a length of the first geographical area satisfies a length threshold, that a diameter of the first geographical area satisfies a diameter threshold, among other examples.

In some situations, detection system 120 may be preconfigured with information identifying the area threshold, the width threshold, the length threshold, and/or the diameter threshold. Additionally, or alternatively, detection system 120 may receive the information identifying the area threshold, the width threshold, the length threshold, and/or the diameter threshold from a device of a network administrator.

In some situations, the area threshold, the width threshold, the length threshold, and/or the diameter threshold may be based on a geographical location associated with base stations 110 (e.g., a city, a rural area, a county, and/or a state, among other examples). For example, a first geographical location may be associated with a first area threshold, a first width threshold, a first length threshold, and/or a second length threshold; a second geographical location may be associated with a second area threshold, a second width threshold, a second length threshold, and/or a second diameter threshold, among other examples. In some situations, an area threshold associated with a rural area may exceed an area threshold associated with a city.

As shown in FIG. 1B, and by reference number 140, detection system 120 may determine a second plurality of vertices. For example, detection system 120 may determine the second plurality of vertices based on determining that the first geographical area satisfies the area threshold. Detection system 120 may determine the second plurality of vertices based on the first plurality of vertices and the estimated location.

In some examples, detection system 120 may use a first vertex of the first plurality of vertices to determine a second vertex of the second plurality of vertices. For instance, when determining the second vertex, detection system 120 may determine a line from a first point, corresponding to a height of the particular base station 110 associated with the first vertex, to the estimated location of the source of interference. The height of the particular base station 110 may be a height from a ground surface. In some examples, detection system 120 may determine the height based on the interference data.

Detection system 120 may identify a second point, on the line, that is located at a distance from the estimated location. In some implementations, the distance may be based on the geographical location associated with the particular. For example, the first geographical location may be associated with a first distance, the second geographical location may be associated with a second distance, among other examples. In some situations, a distance associated with a rural area may exceed a distance associated with a city.

Detection system 120 may identify a third point corresponding to a projection of the second point to the ground surface. Detection system 120 may determine the second vertex as the third point. Detection system 120 may perform similar actions for other base stations 110 to determine the second plurality of vertices. The second plurality of vertices may be closer to the estimated location (of the source of the interference) than the first plurality of vertices are to the estimated location.

Figure 1C:
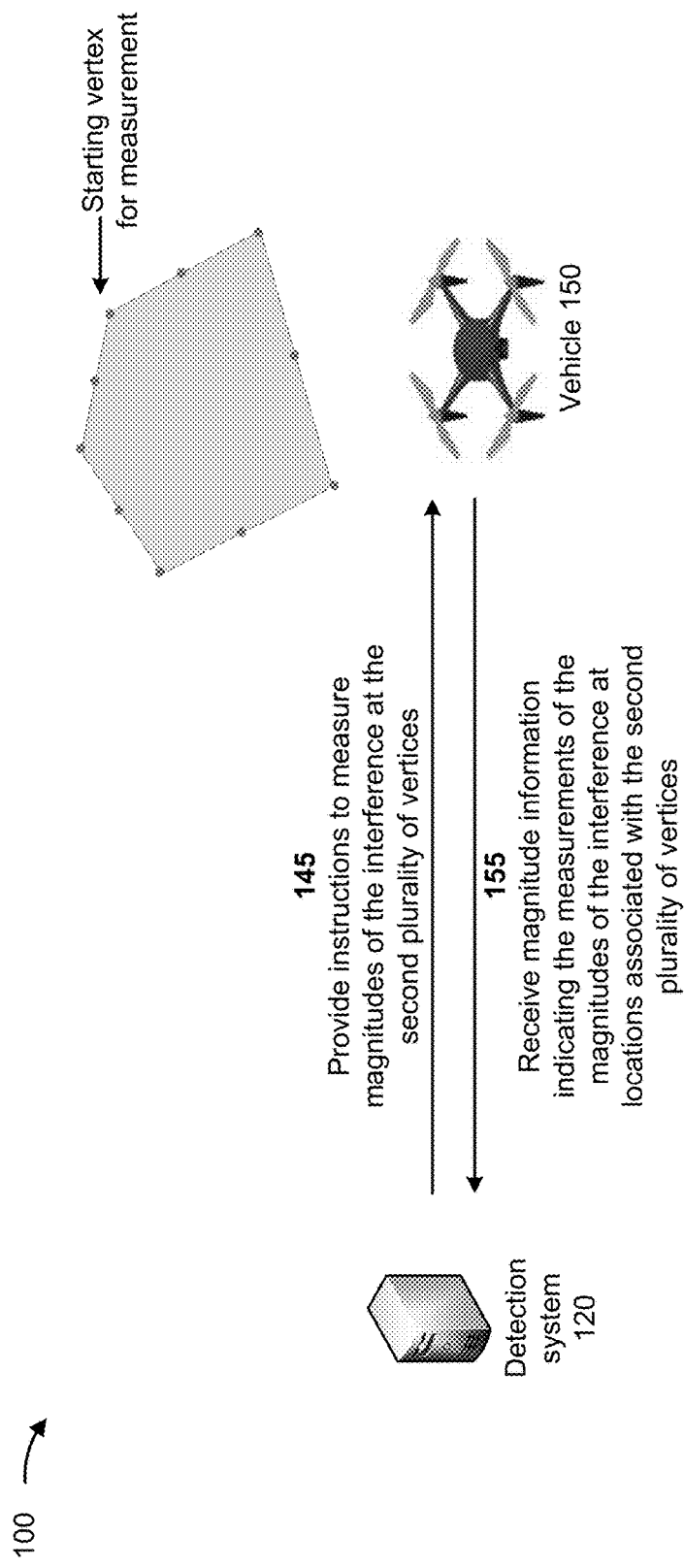

As shown in FIG. 1C, and by reference number 145, detection system 120 may provide instructions to measure magnitudes of the interference at the second plurality of vertices. For example, detection system 120 may provide the instructions to vehicle 150 after determining the second plurality of vertices. In some implementations, the instructions may include information regarding the second plurality of vertices. The information regarding the second plurality of vertices may include information identifying a location associated with each vertex of the second plurality of vertices, information regarding a shape of the first geographical area, information regarding a shape of an area formed by the second plurality of vertices, information regarding cells associated with the interference (e.g., cells of base station 110 subject to the interference), and/or information regarding signal strengths at locations associated with the first plurality of vertices, among other examples.

In some situations, detection system 120 may identify a particular vertex, of the second plurality of vertices, that is closest to the estimated location. In this regard, the information regarding the second plurality of vertices may identify the particular vertex. The instructions may indicate that the magnitude of the interference is to be first measured at the particular vertex followed by a next vertex closest to the particular vertex, followed by a subsequent vertex closest to the next vertex, and so on. The instructions may further include information identifying a center frequency and bandwidth, associated with base station 110, to measure.

As shown in FIG. 1C, vehicle 150 is illustrated as an unmanned aerial vehicle. For example, vehicle 150 may be a drone. Additionally, or alternatively, vehicle 150 may be an autonomous vehicle, such as a self-driving car and/or a self-driving truck, among other examples. Vehicle 150 may be equipped with a spectrum analyzer. Detection system 120 may provide the instructions to vehicle 150 to cause vehicle 150 to navigate to the location associated with each vertex, of the second plurality of vertices, and to obtain measurements of magnitudes of signals within the frequency band.

As an example, based on the instructions, vehicle 150 may first navigate to the location associated with the particular vertex and obtain measurements of magnitudes of signals, within the frequency band, in different directions (e.g., by vehicle 150 performing a 360-degree turn at the location). The measurements of the magnitudes of the signals may indicate a measurement of a magnitude of the interference at the location of the particular vertex. For example, the measurements of the magnitudes of the signals may indicate a measurement of a magnitude of a signal causing the interference.

Vehicle 150 may subsequently navigate to the next vertex and perform similar actions, subsequently navigate to the subsequent vertex and perform similar actions, and so on. Vehicle 150 may generate magnitude information indicating the measurements of the magnitudes obtained by the spectrum analyzer at the locations associated with the second plurality of vertices.

In some situations, detection system 120 may provide the instructions to a device of a field engineer. The device of the field engineer may be a UE 105. The field engineer may be provided with a spectrum analyzer. Based on the instructions, the field engineer may navigate to the locations associated with the second plurality of vertices and obtain the measurements using the spectrum analyzer, in a manner similar to the manner described above in connection with vehicle 150.

As shown in FIG. 1C, and by reference number 155, detection system 120 may receive magnitude information indicating the measurements of the magnitudes of the interference at the locations associated with the second plurality of vertices. For example, detection system 120 may receive the magnitude information from vehicle 150. Alternatively, detection system 120 may receive the magnitude information from the device of the field engineer.

Figure 1D:
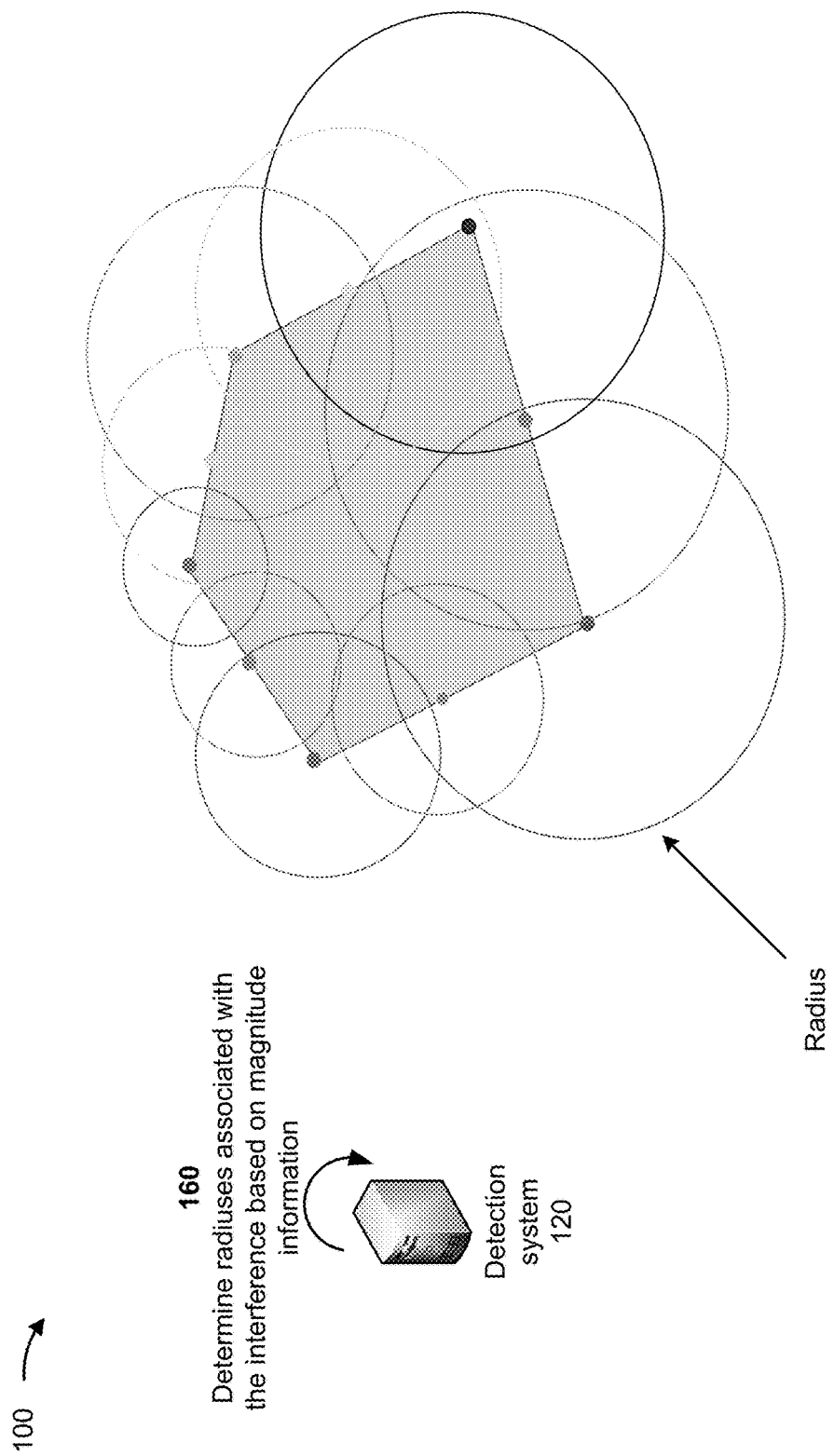

As shown in FIG. 1D, and by reference number 160, detection system 120 may determine radiuses associated with the interference based on the magnitude information. For example, detection system 120 may determine, for each vertex of the second plurality of vertices, a radius associated with the interference. For instance, detection system 120 may determine, for the particular vertex, a radius based on a magnitude of the interference at the location associated with the particular vertex. The radius, determined for the particular vertex, may indicate an estimated distance from the location (associated with the particular vertex) to the source of the interference. In other words, based on the magnitude of the interference at the particular vertex, detection system 120 may determine the estimated distance from the particular vertex to the source of the interference.

In some implementations, detection system 120 may determine the radius (or the estimated distance) using a free-space path loss computation. For example, detection system 120 may determine a free-space path loss value based on the magnitude of the interference at the location associated with the particular vertex and determine the radius associated with the interference based on the free-space path loss value. Detection system 120 may determine a radius for each vertex, of the second plurality of vertices, in a manner similar to the manner described above in connection with the particular vertex.

Figure 1E:
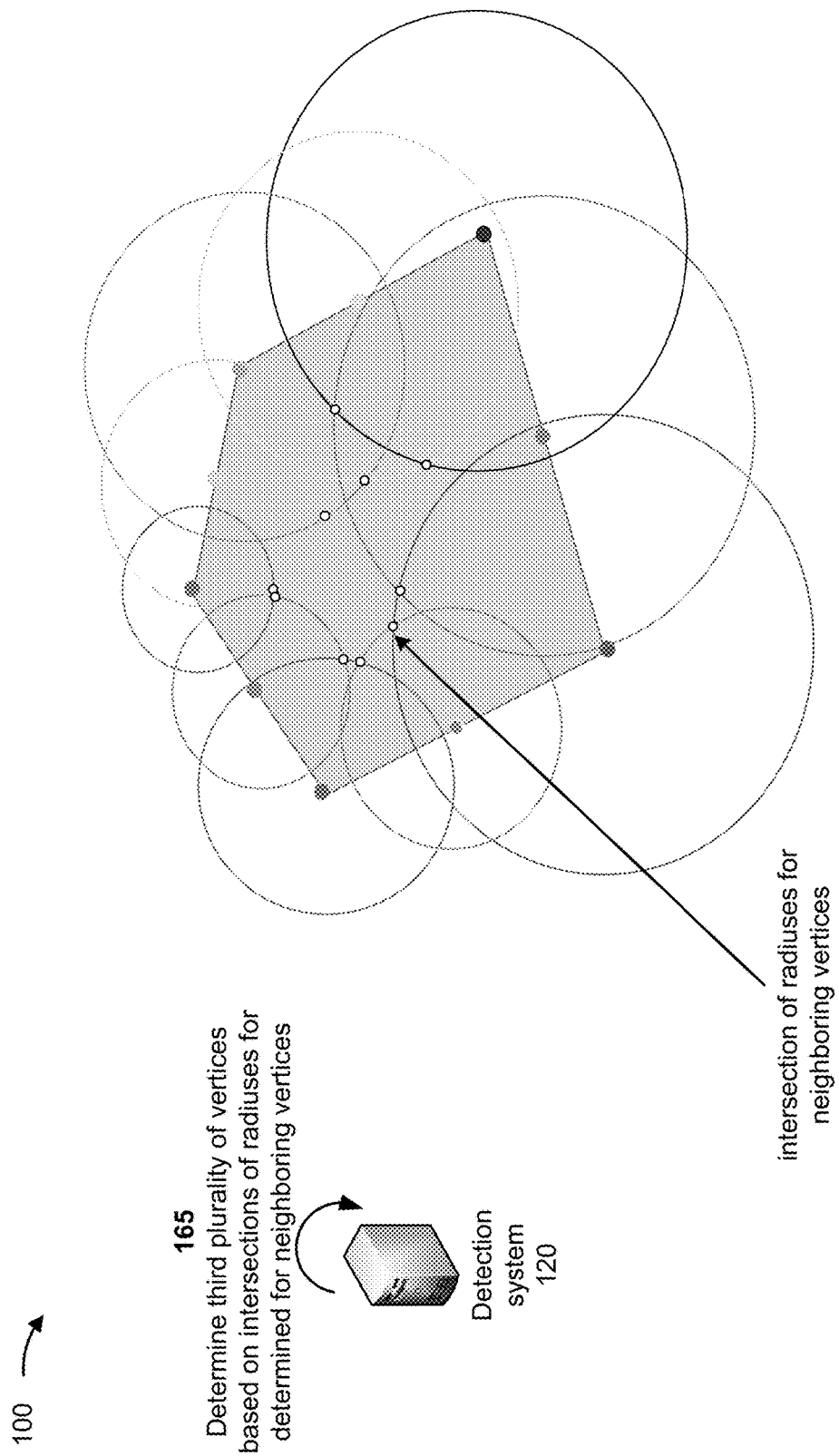

As shown in FIG. 1E, and by reference number 165, detection system 120 may determine a third plurality of vertices based on intersections of radiuses for neighboring vertices. For example, after determining the radiuses for the second plurality of vertices, detection system 120 may analyze the radiuses to identify intersections of radiuses for neighboring vertices. For instance, detection system 120 may identify a first intersection of the radius determined for the particular vertex and the radius determined for the next vertex (which is a neighboring vertex with respect to the particular vertex). Detection system 120 may determine that the first intersection corresponds to a vertex of the third plurality of vertices.

Similarly, detection system 120 may identify a second intersection of the radius determined for the next vertex and the radius determined for the subsequent vertex (which is a neighboring vertex with respect to the next vertex). Detection system 120 may determine that the second intersection corresponds to another vertex of the third plurality of vertices. Detection system 120 may perform similar actions to identify intersections of radiuses of other neighboring vertices and, accordingly, determine other vertices of the third plurality of vertices.

Figure 1F:
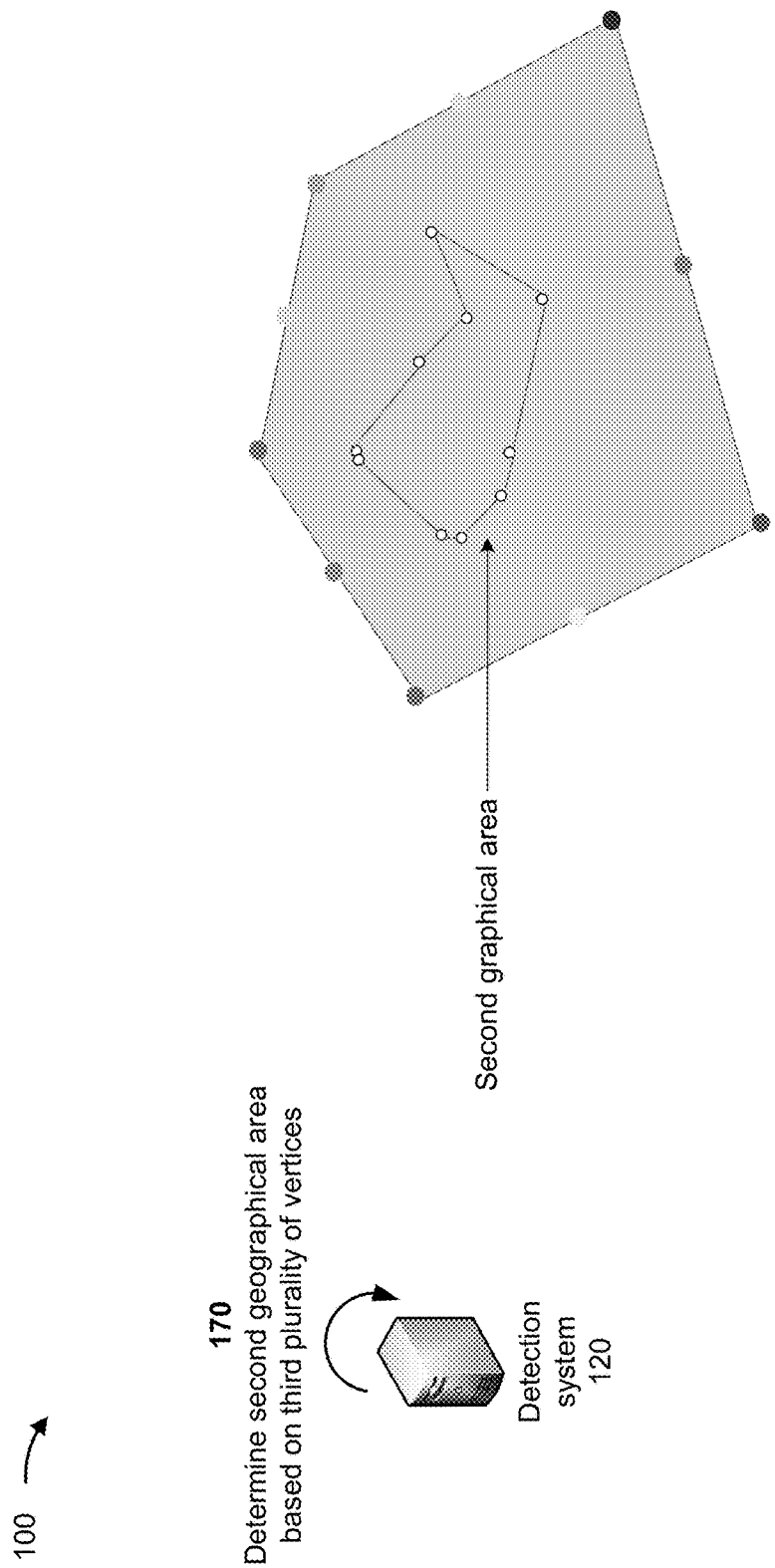

As shown in FIG. 1F, and by reference number 170, detection system 120 may determine a second geographical area based on the third plurality of vertices. For example, the third plurality of vertices may form boundaries of the second geographical area.

As shown in FIG. 1G, and by reference number 175, detection system 120 may refine the second geographical area based on the third plurality of vertices. As shown in FIG. 1G, in some implementations, detection system 120 may combine neighboring intersection points into a single intersection point corresponding to a vertex of the third plurality of vertices. For example, detection system 120 may determine a distance between a first intersection point and a second intersection point of the intersection points. Detection system 120 may determine that the distance does not satisfy a distance threshold. Based on determining that the distance does not satisfy the distance threshold, detection system 120 may combine the first intersection point and the second intersection point as a vertex of the third plurality of vertices.

As shown in FIG. 1G, in some implementations, detection system 120 may determine a boundary for the second geographical area using intersection points that are not neighboring intersection points. For example, detection system 120 may identify a first intersection point and a second intersection point, of the intersection points, as neighboring intersection points. Detection system 120 may identify a third intersection point, of the intersection point, that is not a neighboring intersection point with respect to the first intersection point and the second intersection point.

Detection system 120 may determine a path, between the first intersection point and the third intersection point, that maintains the second intersection point in the second geographical area. In other words, detection system 120 may determine that the path may be a boundary, of the second geographical area, that enables the second intersection point to remain in the second geographical area. Accordingly, detection system 120 may include the first intersection point and the third intersection point as vertices of the third plurality of vertices based on determining the path and remove the second intersection as a vertex of the third plurality of vertices.

Figure 1H:
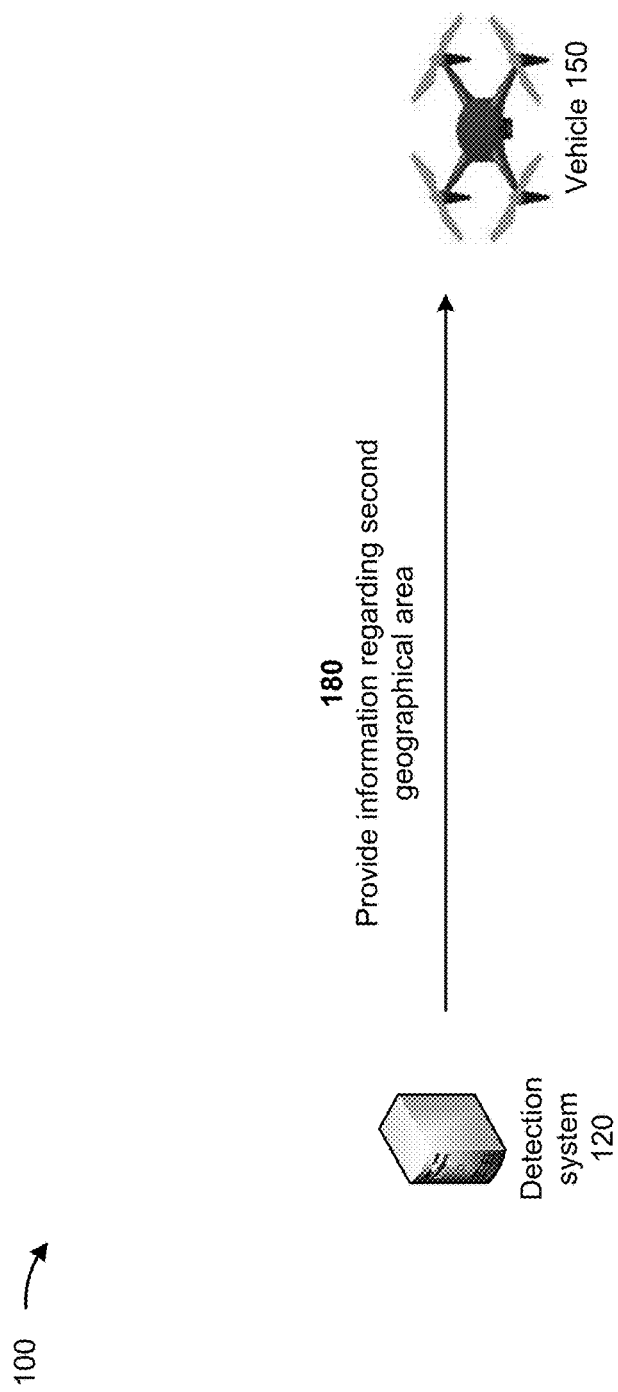

As shown in FIG. 1H, and by reference number 180, detection system 120 may provide information regarding the second geographical area. For example, after refining the second geographical area, detection system 120 may provide the information regarding the second geographical area to cause a search of the second geographical area to identify the source of the interference and/or identify a location of the source of the interference. In some implementations, detection system 120 may provide the information regarding the second geographical area to vehicle 150 to cause vehicle 150 to search the second geographical area to identify the source of the interference and/or the location of the source of the interference.

Additionally, or alternatively, to providing the information regarding the second geographical area to vehicle 150, detection system 120 may provide the information regarding the second geographical area to the device of the field engineer. The field engineer may use the information regarding the second geographical area to search the second geographical area to identify the source of the interference and/or the location of the source of the interference.

In some implementations, detection system 120 may determine whether the second geographical area satisfies the area threshold and may provide the information regarding the second geographical area based on determining whether the second geographical area satisfies the area threshold. For example, detection system 120 may provide the information regarding the second geographical area based on determining that the second geographical area does not satisfy the area threshold.

Alternatively, based on determining that the second geographical area satisfies the area threshold, detection system 120 may perform the actions described in connection with FIGS. 1C-1G to decrease the second geographical area. In some instances, detection system 120 may perform the actions multiple times until detection system 120 determines that a geographical area does not satisfy the area threshold.

Figure 1I:
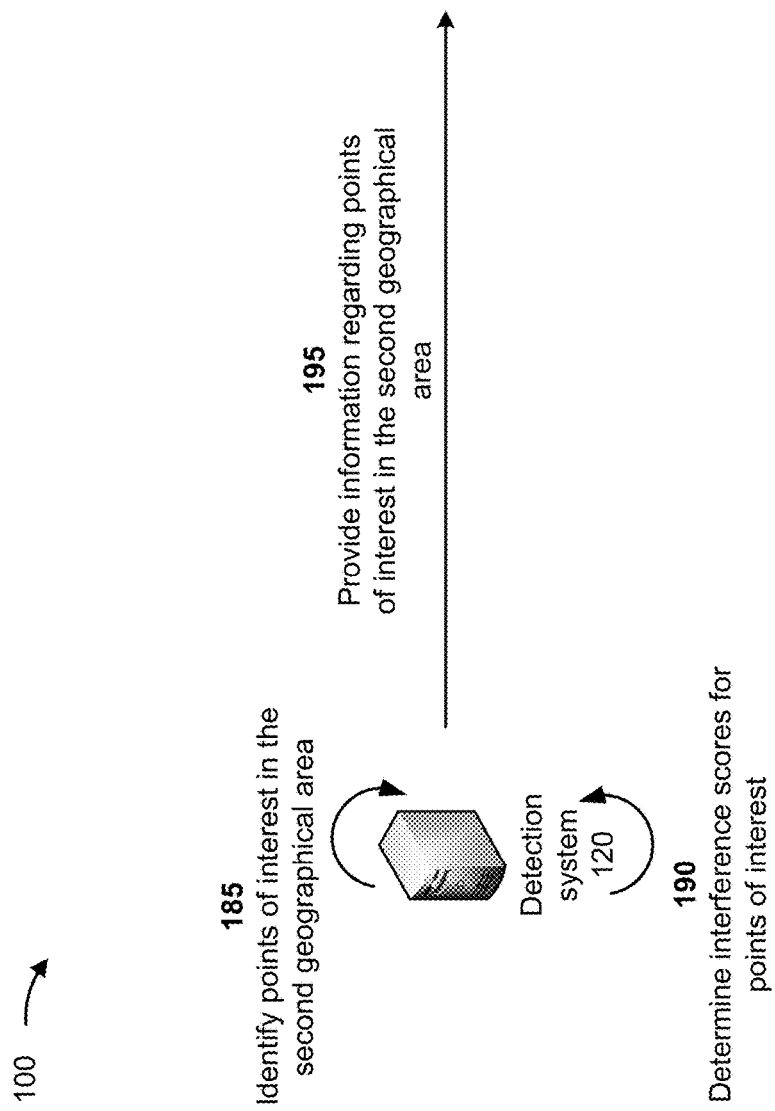

As shown in FIG. 1I, and by reference number 185, detection system 120 may identify points of interest in the second geographical area. In some situations, after providing the information regarding the second geographical area, detection system 120 may receive a notification indicating that the source of the interference has not been identified. Based on receiving the notification, detection system 120 may determine that the points of interest are to be identified to improve a likelihood of success regarding the search for the source of interference.

In some implementations, detection system 120 may obtain point of interest data regarding the points of interest located within the second geographical area. The points of interest may include buildings, residential structures, business structures, commercial structures, roads, and/or transit systems, among other examples. The point of interest data regarding the points of interest may identify a type of each point of interest, a name of each point of interest, and/or a location of each point of interest, among other examples.

The data may be obtained from one or more memories associated with detection system 120. As an example, detection system 120 may perform a lookup of a data structure that stores information regarding different points of interest in association with different geographical locations. Detection system 120 may perform the lookup using geographical coordinates associated with the second geographical area.

In some situations, for each point of interest, detection system 120 may determine an area surrounding the point of interest and provide instructions to vehicle 150 to obtain measurements in the area, in a manner similar to the manner described above in connection with FIG. 1C.

As shown in FIG. 1I, and by reference number 190, detection system 120 may determine interference scores for the points of interest. For example, detection system 120 may determine an interference score for each point of interest based on the measurements obtained in the area surrounding the point of interest. In some implementations, detection system 120 may use an interference algorithm to compute the interference score of a point of interest. For example, detection system 120 may provide, as an input to the algorithm, the measurements obtained in the area surrounding the point of interest and obtain, as an output of the algorithm, the interference score.

In some implementations, for a particular point of interest, detection system 120 may determine a particular type of the particular point of interest. Detection system 120 may determine the particular type based on the point of interest data. In some situations, detection system 120 may use the free-space path loss computation and distance minimization calculations to determine the particular type of the particular point of interest. Additionally, or alternatively, detection system 120 may analyze historical network data to find anomalous "hot spots" that may indicate a proximity of a point of interest of the particular type.

Detection system 120 may determine whether the particular type of point of interest has been previously identified as a source of interference. For example, detection system 120 may determine whether information regarding the particular type of point of interest is stored in a data structure that stores information regarding sources of interference that have been identified. In some situations, the interference score of the particular point of interest may be increased based on determining that the particular type of point of interest has been previously identified.

As shown in FIG. 1I, and by reference number 195, detection system 120 may provide information regarding the points of interest in the second geographical area. For example, detection system 120 may provide the information regarding the points of interest to the device of the field engineer. The field engineer may use the information regarding the points of interest to search (e.g., the areas surrounding the points of interest) to identify the source of the interference and/or the location of the source of the interference.

The information regarding the points of interest may identify the locations of the points of interest, the areas surrounding the points of interest, the types of the points of interest, the interference scores, and/or a ranking of the points of interest, among other examples. In some situations, the points of interest may be ranked based on the interference scores. The ranking of the points of interest may provide an indication, to the field engineer, of an order in which the field engineer is to perform the search (e.g., an order of decreasing interference scores).

By decreasing a geographical area (to be searched to identify the source of the interference) and by providing information regarding the points of interest to adjust a scope of the search for the source of interference, implementations described herein may preserve computing resources (e.g., processing resources, memory resources, and/or communication resources, among other examples), and/or networking resources, among other examples of resources that would have otherwise been consumed by searching large geographical areas to locate the source of interference.

As indicated above, FIGS. 1A-1I are provided as an example. Other examples may differ from what is described with regard to FIGS. 1A-1I. The number and arrangement of devices shown in FIGS. 1A-1I are provided as an example. In practice, there may be additional devices, fewer devices, different devices, or differently arranged devices than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) shown in FIGS. 1A-1I may perform one or more functions described as being performed by another set of devices shown in FIGS. 1A-1I.

Figure 2:
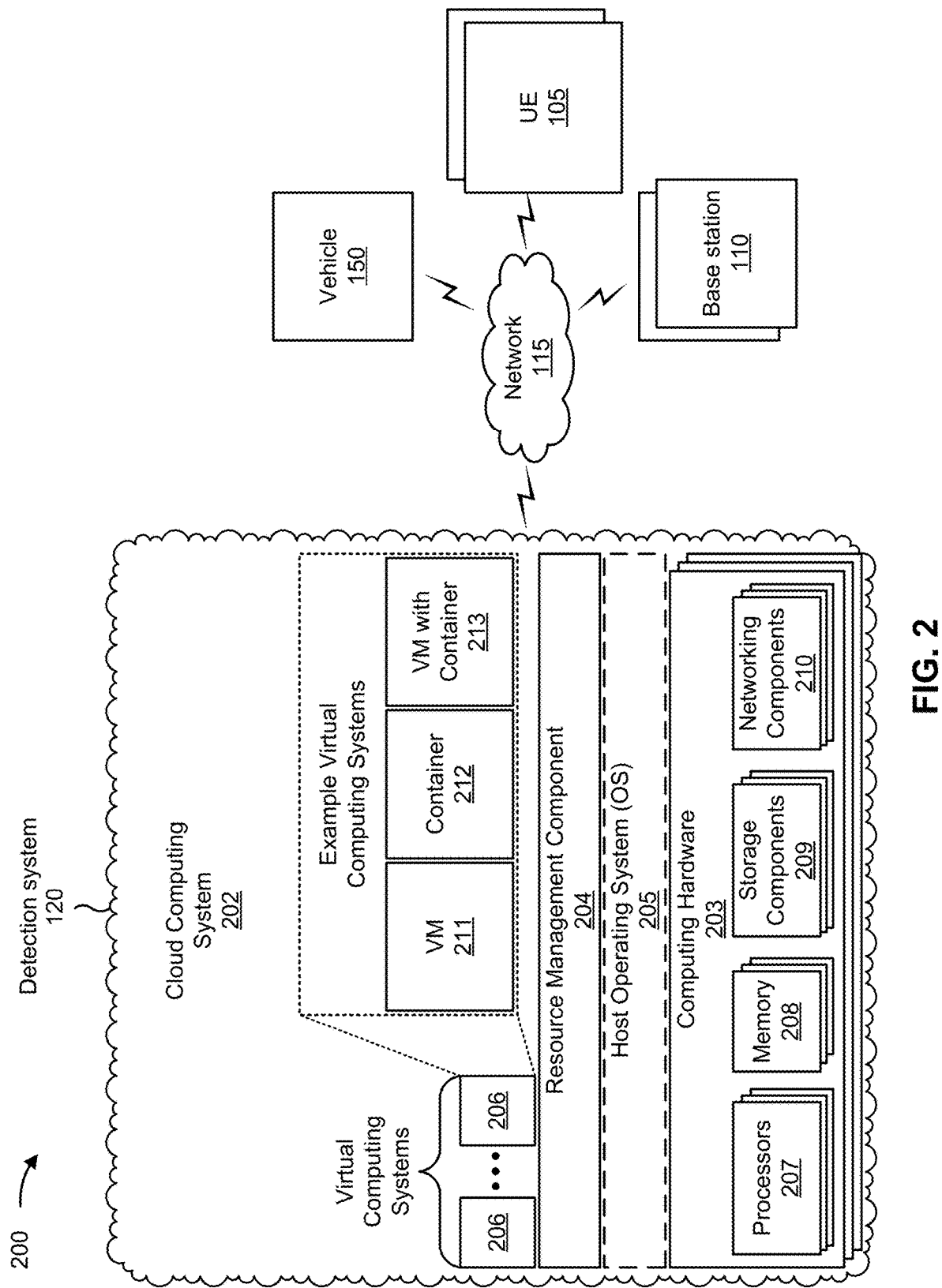
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include detection system 120 which may include one or more elements of and/or may execute within a cloud computing system 202. The cloud computing system 202 may include one or more elements 203-213, as described in more detail below. As further shown in FIG. 2, environment 200 may include network 115, UEs 105, base station 110, and vehicle 150. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, or a hybrid environment 213 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although detection system 120 may include one or more elements 203-213 of the cloud computing system 202, may execute within the cloud computing system 202, and/or may be hosted within the cloud computing system 202, in some implementations, detection system 120 may not be cloud-based (e.g., may be implemented outside of a cloud computing system) or may be partially cloud-based. For example, detection system 120 may include one or more devices that are not part of the cloud computing system 202, such as device 300 of FIG. 3, which may include a stand-alone server or another type of computing device. Detection system 120 may perform one or more operations and/or processes described in more detail elsewhere herein.

Network 115 includes one or more wired and/or wireless networks. For example, network 115 may include a cellular network, a public land mobile network (PLMN), a local area network (LAN), a wide area network (WAN), a private network, the Internet, and/or a combination of these or other types of networks. Network 115 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
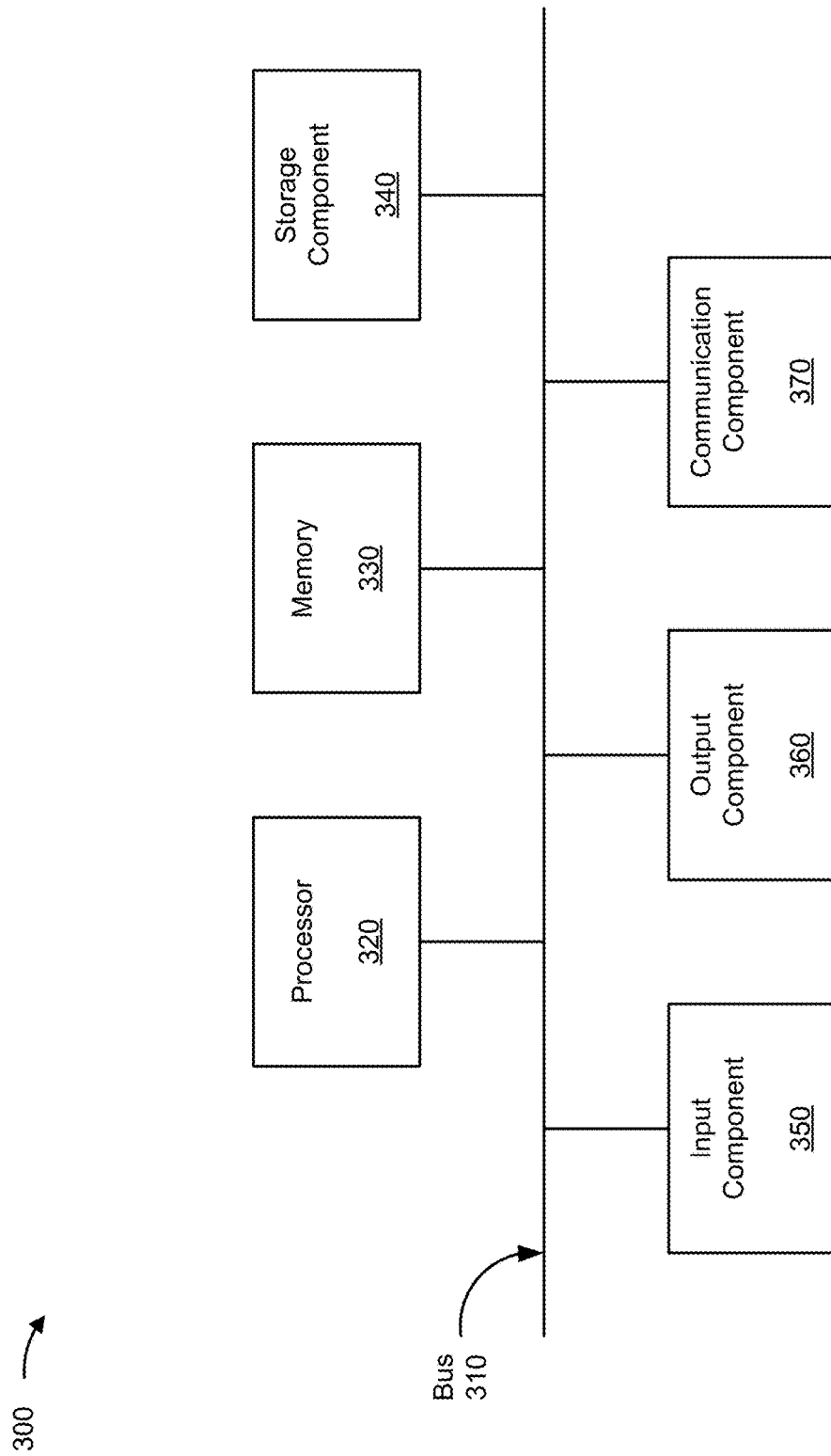
FIG. 3 is a diagram of example components of one or more devices of FIG. 2.

FIG. 3 is a diagram of example components of a device 300, which may correspond to detection system 120, UE 105, and/or base station 110. In some implementations, detection system 120, UE 105, and/or base station 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flowchart of an example process 400 relating to determining a source of interference based on current measurements. In some implementations, one or more process blocks of FIG. 4 may be performed by a device (e.g., detection system 120). In some implementations, one or more process blocks of FIG. 4 may be performed by another device or a group of devices separate from or including the device, such as a base station (e.g., base station 110), a UE (e.g., UE 105), and/or a vehicle (e.g., vehicle 150). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include determining that a first geographical area satisfies an area threshold (block 410). For example, the device may determine that a first geographical area satisfies an area threshold, the first geographical area including an estimated location of a source of interference associated with a plurality of base stations, a first plurality of vertices, of the first geographical area, being based on locations of the plurality of base stations, as described above.

As further shown in FIG. 4, process 400 may include determining a second plurality of vertices based on determining that the first geographical area satisfies the area threshold (block 420). For example, the device may determine a second plurality of vertices based on determining that the first geographical area satisfies the area threshold, the second plurality of vertices being determined based on the estimated location and the plurality of base stations, the second plurality of vertices being closer to the estimated location than the first plurality of vertices to the estimated location, as described above.

In some implementations, a first vertex of the first plurality of vertices is associated with a second vertex of the second plurality of vertices, and wherein determining the second plurality of vertices comprises determining the second vertex based on a height of a base station, of the plurality of base stations, and a point located at a distance from the estimated location, wherein the first vertex is based on a location of the base station.

As further shown in FIG. 4, process 400 may include providing information regarding the second plurality of vertices to a vehicle (block 430). For example, the device may provide information regarding the second plurality of vertices to a vehicle, as described above.

As further shown in FIG. 4, process 400 may include obtaining, from the vehicle, magnitude information indicating magnitudes of the interference measured by a measurement device, associated with the vehicle, at the second plurality of vertices (block 440). For example, the device may obtain, from the vehicle, magnitude information indicating magnitudes of the interference measured by a measurement device, associated with the vehicle, at the second plurality of vertices, the magnitude information being obtained based on providing the information regarding the second plurality of vertices, as described above.

As further shown in FIG. 4, process 400 may include determining a third plurality of vertices based on the magnitude information (block 450). For example, the device may determine a third plurality of vertices based on the magnitude information, as described above.

In some implementations, determining the third plurality of vertices comprises determining, for each vertex of the second plurality of vertices, a radius associated with the interference, wherein the radius is determined based on a magnitude of the interference at each vertex of the second plurality of vertices, and wherein the radius is a distance from the vertex to the estimated location, and determining the third plurality of vertices based on the radius determined for each vertex of the second plurality of vertices.

In some implementations, determining the third plurality of vertices based on the radius determined for each vertex of the second plurality of vertices comprises determining the third plurality of vertices based on intersection points of radiuses determined for neighboring vertices of the second plurality of vertices.

In some implementations, determining the third plurality of vertices based on the intersection points comprises determining a distance between a first intersection point and a second intersection point of the intersection points, determining that the distance does not satisfy a distance threshold, and combining the first intersection point and the second intersection point as a vertex of the third plurality of vertices.

In some implementations, determining the third plurality of vertices based on the intersection points comprises identifying a first intersection point and a second intersection point, of the intersection points, as neighboring intersection points, identifying a third intersection point of the intersection points, wherein the third intersection point is not a neighboring intersection point with respect to the first intersection point and the second intersection point, determining a path, between the first intersection point and the third intersection point, that maintains the second intersection point in the second geographical area, and including the first intersection point and the third intersection point as vertices of the third plurality of vertices based on determining the path.

As further shown in FIG. 4, process 400 may include providing information regarding a second geographical area, formed by the third plurality of vertices, to the vehicle to cause the vehicle to search the second geographical area to identify the source of the interference (block 460). For example, the device may provide information regarding a second geographical area, formed by the third plurality of vertices, to the vehicle to cause the vehicle to search the second geographical area to identify the source of the interference, as described above.

In some implementations, process 400 includes determining points of interest in the second geographical area, determining interference scores for the points of interest, and providing, to the vehicle, information regarding the points of interest based on the interference scores.

In some implementations, process 400 includes receiving a notification indicating that the source of the interference has not been identified, the notification being received after providing the information regarding the second geographical area; and providing information regarding points of interest based on receiving the notification, the points of interest being located in the second geographical area.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method performed by a device, the method comprising:
    determining that a first geographical area satisfies an area threshold,
        the first geographical area including an estimated location of a source of interference associated with a plurality of base stations,
        a first plurality of vertices, of the first geographical area, being based on locations of the plurality of base stations;
    determining a second plurality of vertices based on determining that the first geographical area satisfies the area threshold,
        the second plurality of vertices being determined based on the estimated location and the plurality of base stations,
        the second plurality of vertices being closer to the estimated location than the first plurality of vertices to the estimated location;
    providing information regarding the second plurality of vertices to a vehicle;
    obtaining, from the vehicle, magnitude information indicating magnitudes of the interference measured by a measurement device, associated with the vehicle, at the second plurality of vertices,
        the magnitude information being obtained based on providing the information regarding the second plurality of vertices;
    determining a third plurality of vertices based on the magnitude information; and
    providing information regarding a second geographical area, formed by the third plurality of vertices, to the vehicle to cause the vehicle to search the second geographical area to identify the source of the interference.

2. The method of claim 1, wherein a first vertex of the first plurality of vertices is associated with a second vertex of the second plurality of vertices, and
    wherein determining the second plurality of vertices comprises:
        determining the second vertex based on a height of a base station, of the plurality of base stations, and a point located at a distance from the estimated location,
            wherein the first vertex is based on a location of the base station.

3. The method of claim 1, wherein determining the third plurality of vertices comprises:
    determining, for each vertex of the second plurality of vertices, a radius associated with the interference,
        wherein the radius is determined based on a magnitude of the interference at each vertex of the second plurality of vertices, and
        wherein the radius is a distance from the vertex to the estimated location; and
    determining the third plurality of vertices based on the radius determined for each vertex of the second plurality of vertices.

4. The method of claim 3, wherein determining the third plurality of vertices based on the radius determined for each vertex of the second plurality of vertices comprises:
    determining the third plurality of vertices based on intersection points of radiuses determined for neighboring vertices of the second plurality of vertices.

5. The method of claim 4, wherein determining the third plurality of vertices based on the intersection points comprises:
    determining a distance between a first intersection point and a second intersection point of the intersection points;
    determining that the distance does not satisfy a distance threshold; and
    combining the first intersection point and the second intersection point as a vertex of the third plurality of vertices.

6. The method of claim 4, wherein determining the third plurality of vertices based on the intersection points comprises:
    identifying a first intersection point and a second intersection point, of the intersection points, as neighboring intersection points;
    identifying a third intersection point of the intersection points,
        wherein the third intersection point is not a neighboring intersection point with respect to the first intersection point and the second intersection point;
    determining a path, between the first intersection point and the third intersection point, that maintains the second intersection point in the second geographical area; and
    including the first intersection point and the third intersection point as vertices of the third plurality of vertices based on determining the path.

7. The method of claim 1, further comprising:
    determining points of interest in the second geographical area;
    determining interference scores for the points of interest; and
    providing, to the vehicle, information regarding the points of interest based on the interference scores.

8. A device, comprising:
    one or more processors configured to:
        determine that a first geographical area satisfies an area threshold,
            the first geographical area including an estimated location of a source of interference associated with a plurality of base stations,
            a first plurality of vertices, of the first geographical area, being based on locations of the plurality of base stations;
        determine a second plurality of vertices based on determining that the first geographical area satisfies the area threshold,
            the second plurality of vertices being determined based on the estimated location and the plurality of base stations,
            the second plurality of vertices being closer to the estimated location than the first plurality of vertices to the estimated location;

provide information regarding the second plurality of vertices;

obtain magnitude information indicating magnitudes of the interference, measured by a measurement device, at the second plurality of vertices, the magnitudes of the interference, being measured by the measurement device, based on providing the information regarding the second plurality of vertices;

determine a third plurality of vertices based on the magnitude information; and provide information regarding a second geographical area, formed by the third plurality of vertices, to cause a search of the second geographical area to identify the source of the interference.

9. The device of claim 8, wherein the one or more processors, to provide the information regarding the second plurality of vertices, are configured to:

provide an instruction to first measure a magnitude of the interference a vertex, of the second plurality of vertices, that is closest to the estimated location.

10. The device of claim 8, wherein the one or more processors are further configured to:

receive a notification indicating that the source of the interference has not been identified, the notification being received after providing the information regarding the second geographical area; and provide information regarding points of interest based on receiving the notification, the points of interest being located in the second geographical area.

11. The device of claim 10, wherein the one or more processors, to provide the information regarding the points of interest, are further configured to:

identify the points of interest in the second geographical area;

determine one or more types of points of interest for the points of interest;

determine interference scores for the points of interest based on the one or more types of points of interest;

rank the points of interest based on the interference scores; and provide information regarding the ranked points of interest.

12. The device of claim 8, wherein the one or more processors, to determine the third plurality of vertices, are configured to:

determine, for each vertex of the second plurality of vertices, a radius associated with the interference, wherein the radius is determined based on a magnitude of the interference at each vertex, and wherein the radius is a distance from the vertex to the estimated location; and determine the third plurality of vertices based on the radius determined for each vertex of the second plurality of vertices.

13. The device of claim 12, wherein the one or more processors, to determine the radius associated with the interference, are configured to:

perform a free-space path loss computation using the magnitude of the interference at each vertex of the second plurality of vertices; and determine, for each vertex of the second plurality of vertices, the radius associated with the interference based on performing the free-space path loss computation.

14. The device of claim 8, wherein a first vertex of the first plurality of vertices is associated with a second vertex of the second plurality of vertices, and wherein the one or more processors, to determine the second plurality of vertices, are configured to:

determine a line from a first point, corresponding to a height of a base station of the plurality of base stations, to the estimated location, wherein the first vertex is based on a location of the base station; and determine the second vertex based on a second point, on the line, located at a distance from the estimated location, wherein the distance is based on the location of the base station.

15. A non-transitory computer-readable medium storing a set of instructions, the set of instructions comprising:

one or more instructions that, when executed by one or more processors of a device, cause the device to:

determine that a first geographical area satisfies an area threshold, the first geographical area including an estimated location of a source of interference associated with a plurality of base stations, a first plurality of vertices, of the first geographical area, being based on locations of the plurality of base stations;

determine a second plurality of vertices based on determining that the first geographical area satisfies the area threshold, the second plurality of vertices being determined based on the estimated location and the plurality of base stations;

provide information regarding the second plurality of vertices to cause a measurement device to measure magnitudes of the interference at the second plurality of vertices;

obtain magnitude information indicating the magnitudes of the interference at the second plurality of vertices based on providing the information regarding the second plurality of vertices;

determine a third plurality of vertices based on the magnitude information; and provide information regarding a second geographical area, formed by the third plurality of vertices, to cause a search of the second geographical area to identify the source of the interference.

16. The non-transitory computer-readable medium of claim 15, wherein the one or more instructions, that cause the device to provide the information regarding the second plurality of vertices, cause the device to:

provide the information regarding the second plurality of vertices to a vehicle that includes the measurement device to cause the vehicle to navigate to locations associated with the second plurality of vertices, wherein the vehicle includes an unmanned aerial vehicle or an autonomous vehicle.

17. The non-transitory computer-readable medium of claim 16, wherein the one or more instructions, that cause the device to provide the information regarding the second geographical area, cause the device to:

provide the information regarding the second geographical area to the vehicle to cause the vehicle to search the second geographical area to identify the source of the interference.

18. The non-transitory computer-readable medium of claim 15, wherein a first vertex of the first plurality of vertices is associated with a second vertex of the second plurality of vertices, and
wherein the one or more instructions, that cause the device to determine the second plurality of vertices, cause the device to:
determine the second vertex based on a point, corresponding to a height of a base station of the plurality of base stations, and the estimated location,
wherein the first vertex is based on a location of the base station.

19. The non-transitory computer-readable medium of claim 15, wherein the one or more instructions, that cause the device to determine the third plurality of vertices, cause the device to:
determine, for each vertex of the second plurality of vertices, a radius associated with the interference,
wherein the radius is determined based on a magnitude of the interference at each vertex, and
wherein the radius is a distance from the vertex to the estimated location; and
determine the third plurality of vertices based on the radius determined for each vertex of the second plurality of vertices.

20. The non-transitory computer-readable medium of claim 15, wherein the one or more instructions, that cause the device to provide the information regarding the second plurality of vertices, cause the device to:
provide an instruction to measure a magnitude of the interference at a vertex, of the second plurality of vertices, that is closest to the estimated location.

* * * * *